United States Patent Office.

HELEN M. VAN ETTEN, OF MORAVIA, NEW YORK.

ARTIFICIAL FUEL.

SPECIFICATION forming part of Letters Patent No. 646,650, dated April 3, 1900.

Application filed July 27, 1899. Serial No. 725,248. (No specimens.)

*To all whom it may concern:*

Be it known that I, HELEN M. VAN ETTEN, of Moravia, in the county of Cayuga, in the State of New York, have invented new and useful Improvements in Artificial Fuel, of which the following is a full, clear, and exact description.

This invention relates to the class of artificial fuels in which coal reduced to very fine particles, commonly called "dust," and a coarser grade, usually termed "slack," are utilized to serve as the base or main constituents of the composition forming the fuel.

The object of this invention is to obtain an artificial fuel from coal-dust and slack combined with materials which are inexpensive, readily incorporated in the composition, and materially contribute to the heating capacity of the composition.

To that end the invention consists of a composition for artificial fuel, comprising coal-dust, slack, an "alkali-makers' waste," and alum, all combined with the aid of water in the manner and proportions hereinafter specified. The chief alkali-makers' waste which I desire to use is a waste substance which results from the manufacture of soda-ash.

In practicing my invention with dust and slack of different kinds of coal I have found it expedient to modify to some extent the proportions of the ingredients used, but generally combine them in the proportions as follows to produce approximately a ton of fuel: coal-dust, nine hundred and forty-seven and one-half pounds; slack, nine hundred and forty-seven and one-half pounds; alkali-makers' waste, one hundred pounds; alum, five pounds, and water sufficient to make a wet mass. In mixing the ingredients I proceed as follows: I first mix the alkali-makers' waste with sufficiently-warm water to dissolve the same into a milky state in any suitable receptacle, and while warm I add thereto the alum, which has been previously dissolved in warm water, and then stir the mixture, so as to cause the alum to become thoroughly incorporated. This mixture is then added to the coal-dust and slack and the whole agitated to effectually commingle the ingredients, and at the same time sufficient water is supplied to form a wet mass. Thus a cheap and efficient fuel is produced which can be used in either a wet or dry state.

The purpose of the alum is to moderate the excessive heat which I have found to be evolved by the combustion of the coal-dust and slack mixed with the alkali-makers' waste.

What I claim is—

A composition for artificial fuel comprising coal-dust, slack, an alkali-makers' waste, and alum as specified.

HELEN M. VAN ETTEN. [L. S.]

Witnesses:
J. J. LAASS,
H. B. SMITH.